US006421623B1

(12) United States Patent
Furukawa et al.

(10) Patent No.: US 6,421,623 B1
(45) Date of Patent: Jul. 16, 2002

(54) METHOD FOR INSPECTING THE LIQUID DISCHARGE CONDITION OF LIQUID JET HEAD, AND APPARATUS FOR INSPECTING LIQUID DISCHARGE CONDITION

(75) Inventors: Masao Furukawa; Yasuo Kotaki, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,503

(22) Filed: Jun. 3, 1999

(30) Foreign Application Priority Data

Jun. 10, 1998 (JP) .......................................... 10-178070

(51) Int. Cl.[7] ............................................... G01D 15/18

(52) U.S. Cl. .......................... 702/100; 702/50; 702/55; 347/19; 347/47; 347/23

(58) Field of Search ........................... 702/100, 50, 55; 347/19, 47, 14, 17, 6, 7, 23, 22, 29; 219/121.71

(56) References Cited

U.S. PATENT DOCUMENTS

| | | | | | |
|---|---|---|---|---|---|
| 3,886,564 | A | | 5/1975 | Naylor, III et al. | 346/75 |
| 4,245,224 | A | * | 1/1981 | Isayama et al. | 346/75 |
| 4,313,124 | A | * | 1/1982 | Hara | 346/140 R |
| 4,350,448 | A | * | 9/1982 | Hanagata et al. | 400/120 |
| 4,550,322 | A | | 10/1985 | Tamai | 346/75 |
| 4,555,712 | A | * | 11/1985 | Arway et al. | 346/75 |
| 4,712,172 | A | * | 12/1987 | Kiyohara et al. | 346/1.1 |
| 4,748,461 | A | * | 5/1988 | Elrod | 346/140 R |
| 4,990,932 | A | * | 2/1991 | Houston | 345/45 |
| 5,601,737 | A | * | 2/1997 | Asahi et al. | 219/121.66 |
| 5,627,571 | A | * | 5/1997 | Anderson et al. | 347/19 |
| 5,784,079 | A | * | 7/1998 | Masuda et al. | 347/20 |
| 5,798,778 | A | * | 8/1998 | Kimura et al. | 347/45 |
| 5,808,641 | A | * | 9/1998 | Miyagawa et al. | 347/65 |
| 5,992,981 | A | * | 11/1999 | Sugitani et al. | 347/65 |
| 5,992,984 | A | * | 11/1999 | Imanaka et al. | 347/65 |
| 6,008,914 | A | * | 12/1999 | Sasagawa et al. | 359/15 |
| 6,126,266 | A | * | 10/2000 | Numata et al. | 347/23 |
| 6,164,745 | A | * | 12/2000 | Nagoshi et al. | 347/15 |
| 6,164,850 | A | * | 12/2000 | Speakman | 400/120.09 |
| 6,217,146 | B1 | * | 4/2001 | Takahashi et al. | 347/33 |
| 6,231,167 | B1 | * | 5/2001 | Tsuboi et al. | 347/65 |

FOREIGN PATENT DOCUMENTS

| | | | |
|---|---|---|---|
| JP | 62233252 | * | 10/1987 |
| JP | 64-85772 | | 3/1989 |
| JP | 7-55428 | | 3/1995 |
| JP | 08072253 | * | 9/1998 |

* cited by examiner

*Primary Examiner*—Marc S. Hoff
*Assistant Examiner*—Carol S Tsai
(74) *Attorney, Agent, or Firm*—Fitzpatrick, Cella, Harper & Scinto

(57) ABSTRACT

A method for inspecting the liquid discharge condition of a liquid jet recording head, which is structured by assembling a ceiling plate having discharge ports formed on it to discharge liquid, and energy generating means to generate energy for discharging liquid, comprises the steps of forcing liquid to flow out from the discharge ports of the ceiling plate after the discharge ports are processed and formed on the ceiling plate, but before the assembled structure is formed, of observing and measuring the flow out condition of the liquid, and of calculating the discharge angle of the liquid. With the method thus arranged, it is possible to promptly reflect the inspection result of the liquid discharge direction and angle on the processing step accordingly if any deviation thereof is found from the regular value, thus enhancing the production yields significantly.

13 Claims, 7 Drawing Sheets

METHOD FOR INSPECTING THE LIQUID DISCHARGE CONDITION OF LIQUID JET HEAD, AND APPARATUS FOR INSPECTING LIQUID DISCHARGE CONDITION

BACKGROUND OF THE INVENTION

1. Field of the Invention

The present invention relates to a method for inspecting the liquid discharge condition of a liquid jet head to inspect the processed condition of the discharge ports of the liquid jet recording head mounted on a printer, a copying machine, a facsimile equipment, a word processor, or the like, from which liquid flies onto a recording medium for recording. The invention also relates to an apparatus used for inspecting the liquid discharge condition of a liquid jet recording head.

2. Related Background Art

A liquid jet recording head of a liquid jet recording apparatus comprises fine discharge ports (orifices) that discharge recording liquid, such as ink, contributing to the performance of recording (hereinafter referred to as ink, recording liquid, or some others); liquid flow paths communicated with the discharge ports; and discharge energy generating elements arranged in the corresponding liquid flow paths. Thus, the head is structured to discharge the recording liquid from the discharge ports for recording by the application of the discharge energy to the recording liquid in each of the liquid flow paths that corresponds to each of the discharge energy generating elements when the driving signals are given to each of them in accordance with the recording information, respectively. For such heads, there are known the one that discharges fine liquid droplets by the utilization of thermal energy; the one that utilizes the electro-mechanical converting elements; the one the utilizes the static-electricity; or the one that discharges the recording liquid by the utilization of the complex body formed by them in combination. Of these heads, the liquid jet recording head that discharge the recording liquid by the utilization of thermal energy makes it possible to arrange the recording liquid discharge ports in higher density, through which the recording drops are discharged to form the flying droplets. Thus, recording is possible in higher resolution, in addition to the advantage that with this method, it is easier to make the head compact. As a result, a head of the kind has been widely used in practice.

Now, in order to attain the high density of as many as approximately 600 dpi (dots per inch) as the print density, the head should be formed so that 128 liquid flow paths and discharge ports should be arrange at equal intervals in a range of approximately 5.4 mm, respectively. Then, the arrangement pitches become as fine as approximately 42 μm each. Therefore, for the formation of the liquid flow path grooves and the discharge ports at such fine pitches, it is necessary to use an ultraprecision processing equipment, such as laser processing apparatus, to operate a specific machining in such a high precision.

For the laser processing apparatus to make the grooves and holes by the laser beam irradiated on the resin ceiling plate formed by the injection molding or the like, it is preferable to use the excimer laser processing. Here, as shown in FIG. 6, a laser processing apparatus of the kind comprises in general the laser oscillator 111 that outputs the laser beam L; the beam shaping optical system 112 that shapes the laser beam L irradiated from the laser oscillator 111 uniformly; the illuminating optical system 113 that irradiates the laser beam L to the mask 114; the laser mask 114 formed with the opening pattern 114*a* having the light transmitting regions corresponding to the processing configuration of the work piece W; and the projection optical system 115 that projects the image of the opening pattern, which is transmitted through the laser mask 114, onto the processing surface of the work piece W. Then, it is structured with a jig (not shown) to hold the ceiling plate which is the work piece W, and the movable stage 116 that moves this jig. Further, it is provided with the controlling device to control each of these members.

The ceiling plate is installed on the movable stage 116 with the jig as the work piece W to form the liquid flow path grooves and the discharge ports on it. Then, the processing surface thereof is positioned on the optical axis of the laser beam L. The laser beam L oscillated from the laser oscillator 111 is irradiated onto the processing surface of the ceiling plate through the laser mask 114 to process the liquid flow path grooves and the discharge ports.

The liquid jet recording head that uses the ceiling plate which is the work piece W, having the liquid flow path grooves and discharge ports thus formed, is structured as shown in FIG. 7. In FIG. 7, the discharge ports 102 and the liquid flow paths 103 are processed to be formed, and then, the ceiling plate 100 provided with the liquid chamber 104 is bonded with or adhesively joined to the elemental substrate (discharge energy generating means) 107 having a plurality of the discharge energy generating elements (heaters, for example) 106 arranged at given intervals in high precision by the application of ultraprecision etching techniques or the like in the state that each of the liquid flow paths 103 on the ceiling plate 100 is positioned with each of the discharge energy generating element 106, respectively. Hence, the liquid jet recording head H is manufactured.

The discharge direction of liquid discharged from the liquid jet recording head is usually controlled by the direction in which each of the discharge ports are processed and formed. However, after the laser oscillator and illuminating optical system of the laser processing apparatus are cleaned for maintenance or the like, the laser optical axis is subjected to fine deviation eventually, and the direction of the discharge ports thus processed may be varied in some cases. As a result, the discharge direction of liquid is varied, accordingly, hence causing the occurrence of such event as the creation of satellites (the smaller liquid droplets than the main liquid droplets which are discharged behind the main liquid droplets to form the images) that may invite the degradation of print quality, among some others that may take place.

Now, the inspection of the liquid discharge direction and print quality of a liquid jet recording head is usually carried out in general in such a manner that after the recording head is manufactured by bonding the ceiling plate having the discharge ports processed and formed on it with the elemental substrate (discharge energy generating means), liquid (ink) is actually discharged by driving the heaters for the intended inspection of the flying condition of liquid and the impacted point of each of them, and the like. Then, as a result of such inspection, it is determined whether or not the discharge ports thus processed and formed are suitable for the desired print quality in terms of the liquid discharge direction, the creation of satellites, or the like. The result of this determination is fed back to the manufacturing step of the ceiling plate of the recording head, thus correcting the formation angle of the discharge ports. With an inspection method of the kind, it is impossible to allow the result of the inspection, such as deviation of liquid discharge direction, to be reflected on the processing step of the ceiling plate at once so as to improve the production yield of the ceiling plate significantly.

SUMMARY OF THE INVENTION

The present invention is designed in consideration of the problems to be solved for such improvement required for the conventional techniques discussed above. It is an object of the invention to provide a method for inspecting the liquid discharge condition of a liquid jet recording head, which is capable of inspecting the discharge direction of the liquid discharged from the ceiling plate in a short period of time immediately after the discharge ports are formed on the ceiling plate, and also, capable of feeding back the correcting value at once if the liquid discharge angle is deviated from the regular value which is set in advance so as to process and form the discharge ports at the regular angle. It is also an object of the invention to provide an apparatus used for inspecting the discharge condition of a liquid jet recording head.

In order to achieve the objectives described above, the method of the present invention for inspecting the liquid discharge condition of a liquid jet recording head, which is structured by assembling a ceiling plate having discharge ports formed on it to discharge liquid and energy generating means to generate energy for discharging liquid, comprises the steps of forcing liquid to flow out from the discharge ports of the ceiling plate after the discharge ports are processed and formed on the ceiling plate, but before the assembled structure is formed; of observing and measuring the flow out condition of the liquid; and of calculating the discharge angle of the liquid.

For the method of the invention for inspecting the liquid discharge condition of a liquid jet recording head, it is preferable to make the arrangement so that the result of the calculation of the liquid discharge angle is fed back to the processing step of the discharge ports of the ceiling plate.

For the method of the invention for inspecting the liquid discharge condition of a liquid jet recording head, it is preferable to make the arrangement so that the ceiling plate is fixed in the liquid tank immediately after the discharge ports are processed and formed on the ceiling plate, and liquid is injected into the liquid tank to exert pressure on the liquid to force the liquid to flow out from the discharge ports, and that the liquid used is water or the same kind of liquid as the recording liquid actually used for recording images.

For the method of the invention for inspecting the liquid discharge condition of a liquid jet recording head, the pressure exerted on the liquid breaks the menisci of the discharge ports of the ceiling plate to form the condition of continuous flow out of the liquid. Here, it may be possible to use compressed air to exert pressure on the liquid or to adopt a vibrating plate, which is provided with piezoelectric devices, to exert pressure on the liquid.

Also, in order to achieve the objectives described above, the apparatus of the present invention for inspecting the liquid discharge condition of a liquid jet recording head comprises means for forcing liquid to flow out from the discharge ports of a single ceiling plate after the discharge ports are processed and formed thereon; and an observation and measurement system to observe and measure the flow out condition of the liquid from the discharge ports, and to calculate the discharge angle of the liquid.

For the apparatus of the invention for inspecting the liquid discharge condition of a liquid jet recording head, it is preferable to make arrangement so that the apparatus further comprises controlling means for feeding back the result of the calculation of the liquid discharge angle by the observation and measurement system to the processing step of the discharge ports.

For the apparatus of the invention for inspecting the liquid discharge condition of a liquid jet recording head, it is preferable to make arrangement so that means for forcing the liquid to flow out from the discharge ports of the ceiling plate comprises a liquid tank containing the liquid and having pressure means for exerting a specific pressure on the liquid, and a ceiling plate fixing mechanism in the liquid tank to fix the ceiling plate in it.

For the apparatus of the invention for inspecting the liquid discharge condition of a liquid jet recording head, it is preferable to arrange the liquid tank to be installed on a movable stage, and provided with an opening on the bottom thereof to enable the discharge ports of the ceiling plate to be exposed downward, and also, to enable the ceiling plate fixing mechanism to position the discharge ports of the ceiling plate on the opening and fix the ceiling plate.

For the apparatus of the invention for inspecting the liquid discharge condition of a liquid jet recording head, it is possible to structure the pressure means of the liquid tank to exert pressure on liquid in the liquid tank by supplying compressed air into the liquid tank or to provided the pressure means of the liquid tank with a vibrating plate having piezoelectric devices on the upper part of the liquid tank so as to exert pressure intermittently by driving the piezoelectric devices.

In accordance with the method of the present invention for inspecting the liquid discharge condition of a liquid jet recording head, by use of the ceiling plate immediately after the discharge ports are processed and formed, that is, the ceiling plate without discharge energy generating means assembled with it, liquid is forced to flow out from the discharge ports of the ceiling plate to observe and measure the flow out condition thereof. Then, the liquid discharge direction.and the liquid discharge angle are inspected by measuring the liquid discharge angle only with the ceiling plate having the discharge ports processed and formed, and if the result of the inspection indicates that the liquid discharge direction and angle are found to be deviated from the regular direction and value, the correcting value is promptly fed back to the processing step of the discharge ports to adjust the formation angle of the discharge ports accordingly for the improvement of the production yield thereof.

Also, in accordance with the apparatus of the present invention for inspecting the liquid discharge condition of a liquid jet recording head, it is possible to inspect the liquid discharge direction and the liquid discharge angle promptly and exactly with a simple structure provided with means for forcing liquid to flow out from the discharge ports, which is formed by a liquid tank containing the liquid and having pressure means to exert a specific pressure on the liquid, as well as formed by the ceiling plate fixing mechanism to fix the ceiling plate in the liquid tank, and an observation and measurement system to observe and measure the flow out condition of the liquid from the discharge ports to calculate the discharge angle of the liquid. Further, the apparatus is provided with controlling means to feed back the result of the calculation of the liquid discharge angle by the observation and measurement system to the processing step of the discharge ports promptly. With the structure thus arranged, the correcting value can be fed back to the processing step thereof at once for the significant improvement of the production yield of the ceiling plate that constitutes a recording head.

DETAILED DESCRIPTION OF THE PREFERRED EMBODIMENTS

Hereinafter, in conjunction with the accompanying drawings, the embodiments will be described in accordance with the present invention.

Figure 1:
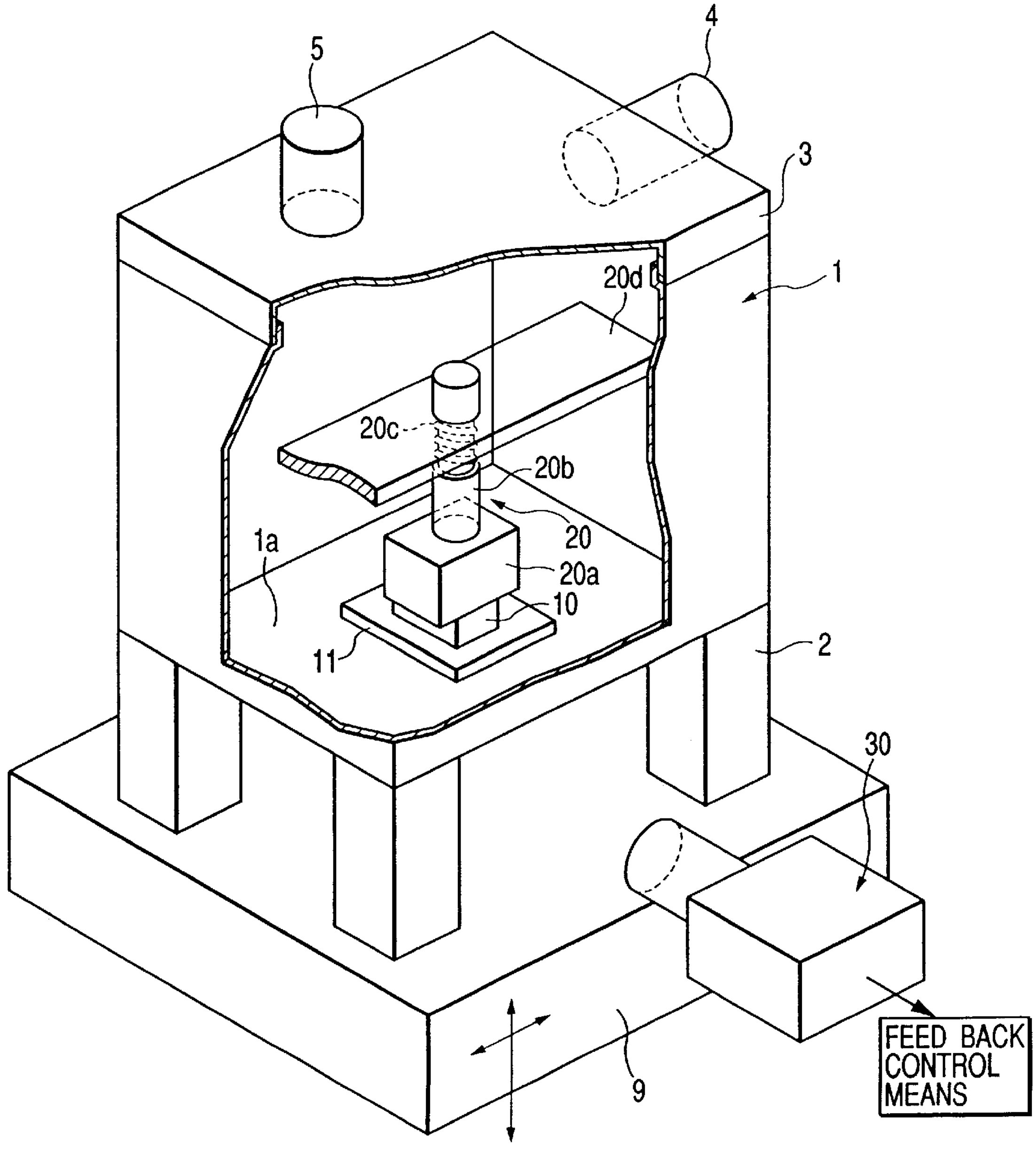
FIG. 1 is a perspective view which schematically shows the entire structure of an apparatus of the present invention for inspecting the liquid discharge condition, with a part of the side wall being broken for representation: this apparatus is to measure the discharge direction by discharging liquid from the discharge ports of the ceiling plate of a liquid jet recording head.
Figure 2:
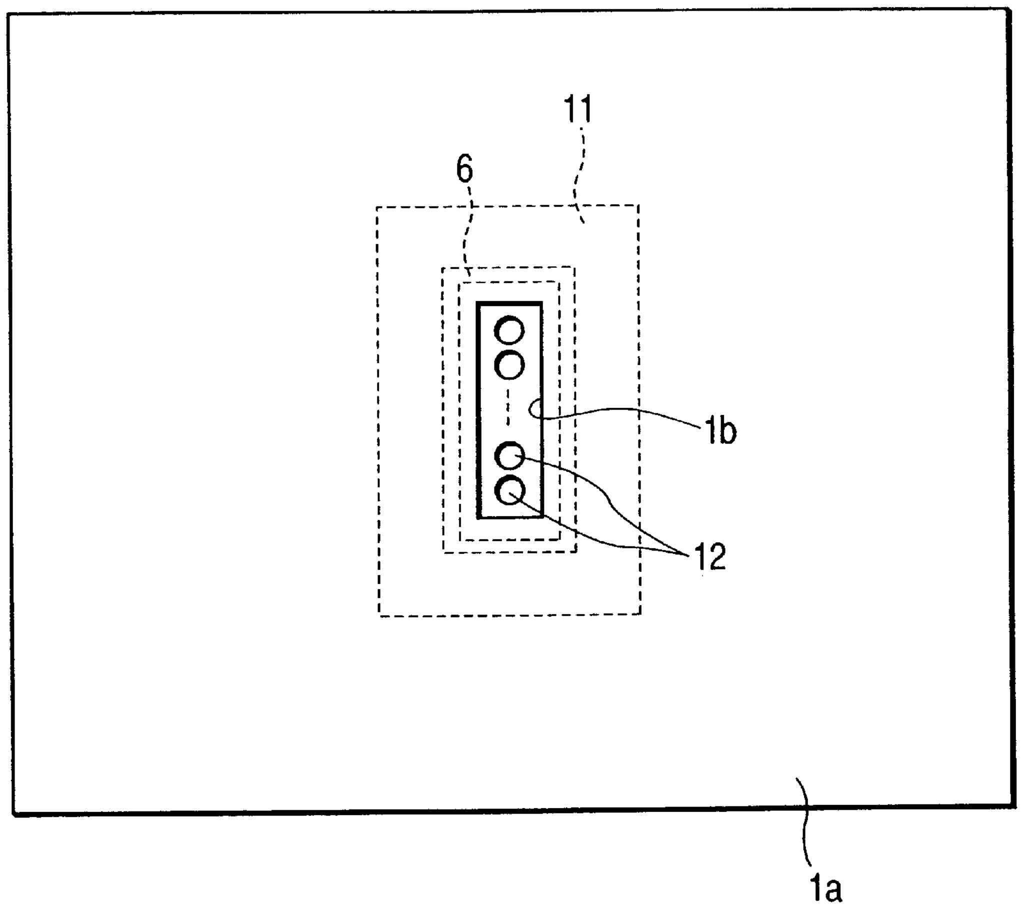
FIG. 2 is a bottom view which shows the apparatus for inspecting the liquid discharge condition represented in FIG. 1, observed from the reverse side of the bottom plate of the liquid tank thereof.
Figure 3:
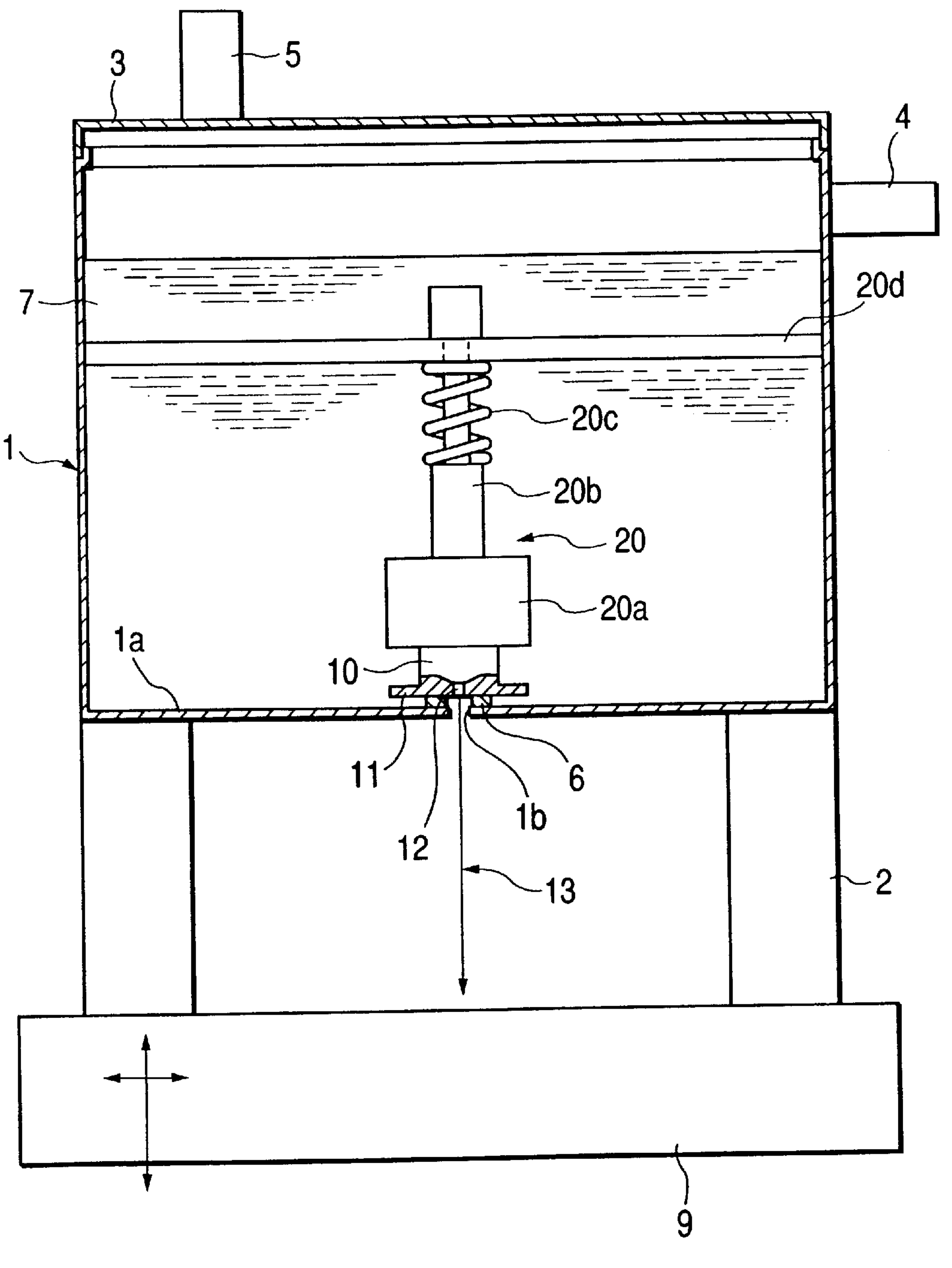
FIG. 3 is a partly broken cross-sectional view which schematically shows the apparatus for inspecting the liquid discharge condition, which represents the state where liquid is allowed to continuously flow out from the discharge ports of the ceiling plate.

FIG. 1 is a perspective view which schematically shows the entire structure of an apparatus for inspecting the liquid discharge condition to measure the discharge direction of liquid discharged from the discharge ports of the ceiling plate that constitutes a liquid jet recording head, with a part of the side wall being broken for representation. FIG. 2 is a bottom view which shows the apparatus for inspecting the liquid discharge condition represented in FIG. 1, observed from the reverse side of the bottom plate of the liquid tank thereof. FIG. 3 is a partly broken cross-sectional view which schematically shows the apparatus for inspecting the liquid discharge condition, which represents the state where liquid is allowed to continuously flow out from the discharge ports of the ceiling plate.

As shown in FIG. 1, the apparatus of the present invention for inspecting liquid discharge condition comprises the liquid tank 1 for containing liquid, which is provided with pressure means for exerting specific pressures on the liquid; means for forcing liquid to flow out from the discharge ports of the ceiling plate, which is formed by the ceiling plate fixing mechanism 20 in the liquid tank 1 to fix the ceiling plate 10 that constitutes a liquid jet recording head; the observation measurement system 30 which is installed in the vicinity of the liquid tank 1 to observe and measure the flow-out condition of the liquid that flows out from the discharge portion formed on the ceiling plate 10, and to calculate the liquid discharge direction and the discharge angles; and controlling means (not shown) to feed back the calculated result of the liquid discharge angle by the observation measurement system 30 to the step of processing the discharge ports.

The liquid tank 1 is installed on the movable stage 9, which is structured to be movable in the top to bottom direction and in the directions to the left and right, through the stand 2. The ceiling plate fixing mechanism 20 installed in the interior of the liquid tank 1 comprises the ceiling plate fixing jig 20*a* to fix the ceiling plate 10; the shaft 20*b* which is supported movably in the top to bottom direction by the fixing member 20*d* fixed to both side walls of the liquid tank 1 to face each other, and which is also arranged to hold the ceiling plate fixing jig 20*a;* and the pressure spring 20*c* installed around the shaft 20*b* to bias the ceiling plate fixing jig 20*a* downward. Also, as shown in FIG. 2 and FIG. 3, on the bottom 1*a* of the liquid tank 1, there is provided a cut-off opening 1*b* to enable the discharge ports 12 of the ceiling plate 10 to be exposed downward when the ceiling plate 10 is fixed by the ceiling plate fixing mechanism 20. Then, on the circumference of the opening 1*b,* a sealing member 6 is arranged. The sealing member 6 abuts upon the discharge port plate 11 of the ceiling plate 10 to function as a seal to prevent the leakage of liquid in the interior of the liquid tank 1. On the side wall of the liquid tank 1, a liquid injection inlet 4 is arranged to inject liquid, and the covering member 3 that airtightly closes the liquid tank 1 is provided with a compressed air supply port 5. Then, the arrangement is made so that the compressed air is supplied from the outside through this compressed air supply port 5 to pressure liquid in the interior of the liquid tank 1. Thus, the liquid tank 1 is formed by the transparent material, such as acrylic resin, to be able to observe the ceiling plate 10 fixed in the interior thereof by use of the observation measurement system 30. Further, since pressure is exerted as described later, the liquid tank is formed with a strength good enough not to be broken by the pressure to be exerted.

Now, as to the liquid discharge inspection apparatus thus structured, the inspection procedure will be described.

As shown in FIG. 1 to FIG. 3, the ceiling plate 10 having the discharged ports 12 processed and formed on it is stacked on the sealing member 6 with the discharge port plate 11 downward so that the discharge ports 12 are placed to face the opening 1*b* of the bottom plate 1*a* of the liquid tank 1, and then, fixed to the lower part of the ceiling plate fixing mechanism 20 by use of the ceiling plate fixing jig 20*a* which is biased by the spring. After that, liquid 7 is injected into the liquid tank 1 from the liquid injection port 4. The injection is continued until the water level becomes higher than the ceiling plate 10. Here, as the liquid 7, it is preferable to use water or the same kind of liquid as the recording liquid used for the actual image recording. In accordance with the present embodiment, the liquid used is the one that contains the water soluble dyestuffs containing anion group and water, water soluble organic solvent, and other components (viscosity control agent, pH control agent, antiseptic agent, interfacial active agent or oxidation inhibitor, for example) as required. More specifically, the liquid of the following composition is used:

C. I food black-2: 3% glycerin: 15% water: 82%

Then, after the liquid tank 1 is airtightly closed by the cover member 3, compressed air is supplied into the liquid tank 1 through the compressed air supply port 5 to press the liquid 7 in the liquid tank 1. When the pressure is exerted on the liquid 7 in the liquid tank 1 to break the menisci at the discharge ports to enable the flow-out condition to be formed continuously, the liquid 7 flows out from the discharge ports 12 continuously as the water flux 13 as shown in FIG. 3.

Figure 4A:
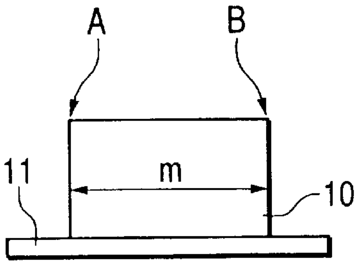
FIGS. 4A, 4B, 4C and 4D are views which schematically illustrate the processes to measure the discharge angle of liquid discharged from the ceiling plate.
Figure 4B:
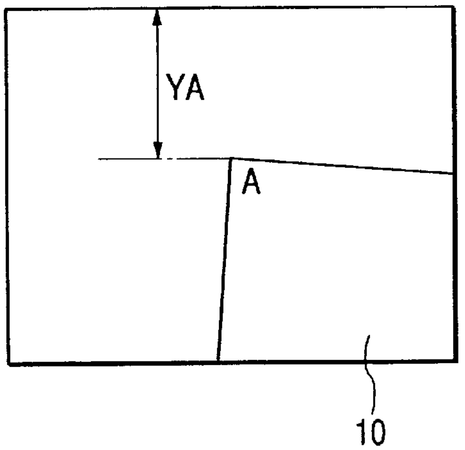
Figure 4C:
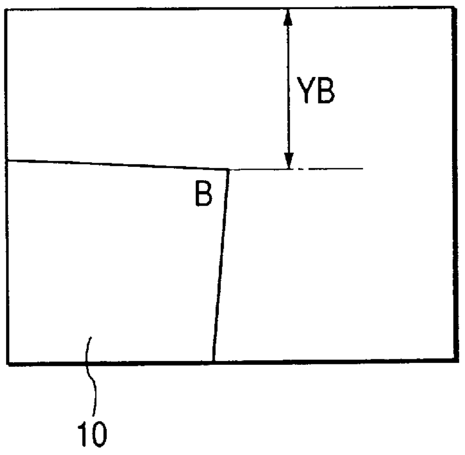

Now, with reference to FIGS. 4A to 4D, the description will be made of the algorithm for measuring the flow-out angle of the water flux which flows out form the discharge ports. FIG. 4A is a view which schematically shows the state of the ceiling plate 10 being fixed in the interior of the liquid tank 1. Since the discharge angle of liquid is controlled on the basis of the surface (the side AB between both corners A and B of the ceiling plate 10 in FIG. 4A, for example) which is referenced in processing to form the discharge ports, the reference matching is performed before the measurement of the discharged liquid. In other words, both of the corners A and B which become the reference side AB of the ceiling plate 10 are measured, respectively, before the liquid is supplied into the interior of the liquid tank 1. At first, the movable stage 9 is adjusted so that the point A of the ceiling plate 10 is placed within the observable range of the observation measurement system 30 as shown in FIG. 4B. Then, the point A is observed by use of the observation measurement system 30. The pixel numbers YA are recorded by the observation measurement system 30 from the upper end to the point A. Subsequently, as shown in FIG. 4C, the movable stage 9 is horizontally moved to make it possible to observe the point B, and the pixel number YB are recorded in the same manner. Here, given the resolution (the actual length per pixel) of the observation measurement system in the top to bottom direction as dY, the amount of deviation $\delta$ between the points A and B in the top to the bottom direction is calculated by the expression (1) as follows:

$$\delta=(YB-YA)\times dY \qquad (1)$$

Also, as shown in FIG. 4A, the inclined angle $\theta_T$ of the ceiling plate 10 is obtainable by the following expression (2) on the basis of the width (the side AB) of the reference surface of the ceiling plate 10:

$$\theta_T=\sin^{-1}(\delta/m) \qquad (2)$$

Figure 4D:
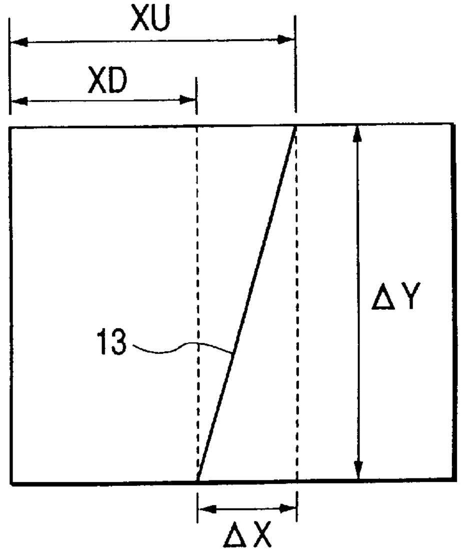

Then, the liquid 7 injected into the liquid tank 1 is pressurized so as to break the menisci of the discharge ports to form the state where the liquid flows out continuously. Thus, as shown in FIG. 3, the liquid 7 flows out continuously from the discharge ports 12 as water flux 13. The water flux 13 is observed and measured by use of the observation and measurement system 30. FIG. 4D is a view which schematically shows the state that the water flux 13 is being observed by use of the observation and measurement system. In FIG. 4D, the amount of deviation ΔX in the left and right directions is obtained from the differences in the pixel numbers in the left and right directions both at the top and bottom ends of the water flux in the observation region. Then, the deviated angle $\theta_E$ against the vertical axis is calculated in the following sequence:

Given the solution (the actual length per pixel) in the left and right directions in the observation and measurement system as dX, the ΔX is calculated by the following expression (3):

$$\Delta X=(XU-XD)\times dX \qquad (3)$$

The ΔY is calculated by the following expression (4) from the total pixel number NY in the vertical direction and the solution dY in the vertical direction of the observation and measurement system:

$$\Delta Y=NY\times dY \qquad (4)$$

Therefore, the deviated angle $\theta_E$ of the water flux 13 of the discharged liquid against the vertical axis of the water flux 13 is obtainable form the following expression (5):

$$\theta_E=\tan^{-1}(\Delta Y/\Delta X) \qquad (5)$$

Then, the value, which is arrived at by subtracting the deviated angle $\theta_T$ of the ceiling plate 10 calculated by the expression (2) from the $\theta_E$, is the discharge angle θ to the axis 0° perpendicular to the reference surface (the side AB in FIG. 4A) of the ceiling plate 10 as given below.

$$\theta=\theta_E-\theta_T \qquad (6)$$

The discharge angle θ thus calculated is the angle at which liquid is discharged from the discharge ports 12 processed and formed on the ceiling plate 10. Then, if this discharge angle θ is deviated from the regular value which has been set in advance, the discharge angle θ thus obtained is immediately fed back to the discharge port laser processing step, hence making it possible to correct it to the regular discharge angle.

Figure 5:
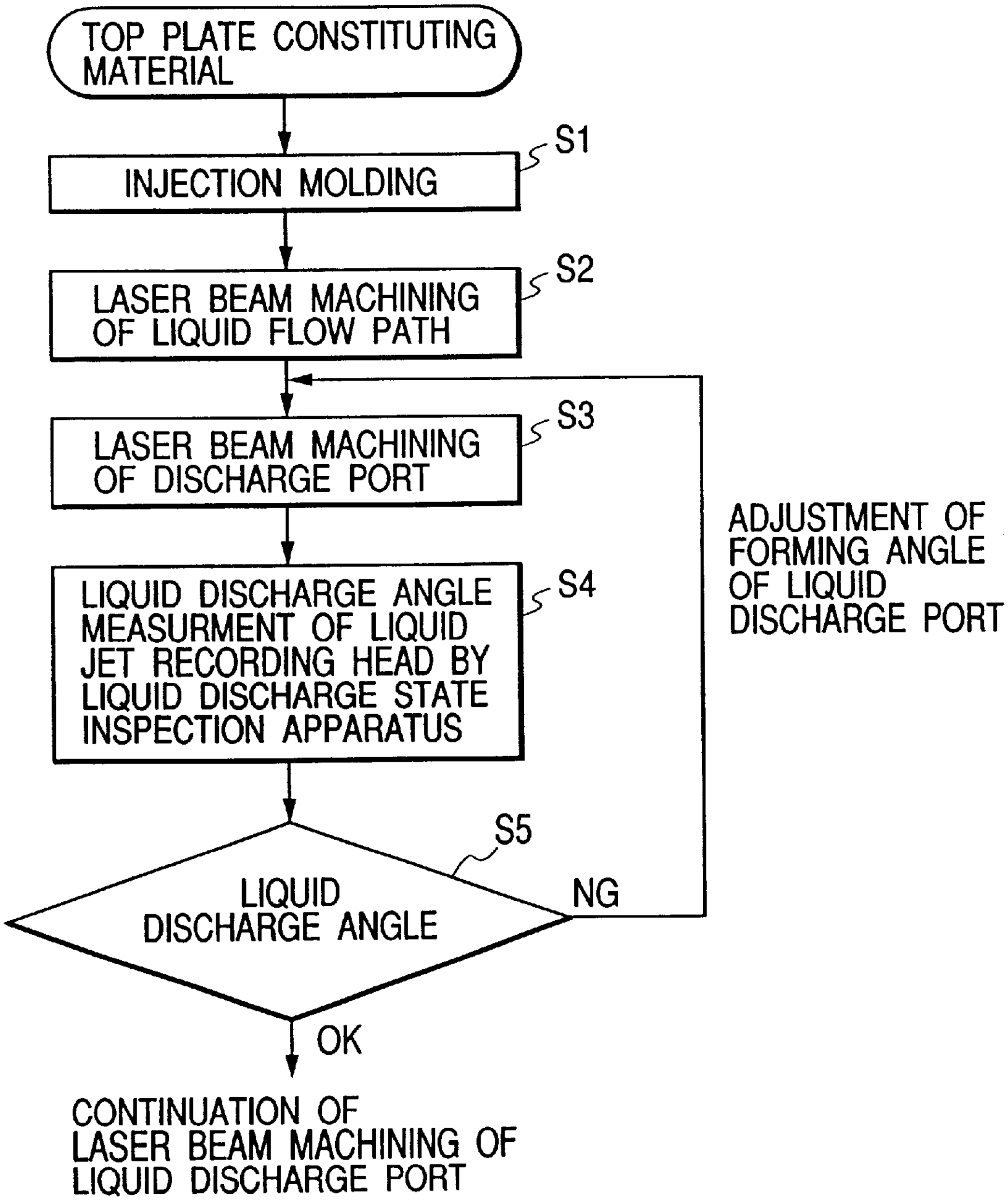
FIG. 5 is a flowchart which shows the mode in which the measured liquid discharge angle is fed back to the manufacturing step of a liquid jet recording head for the correction of the angle of the discharge ports to be processed.
Figure 6:
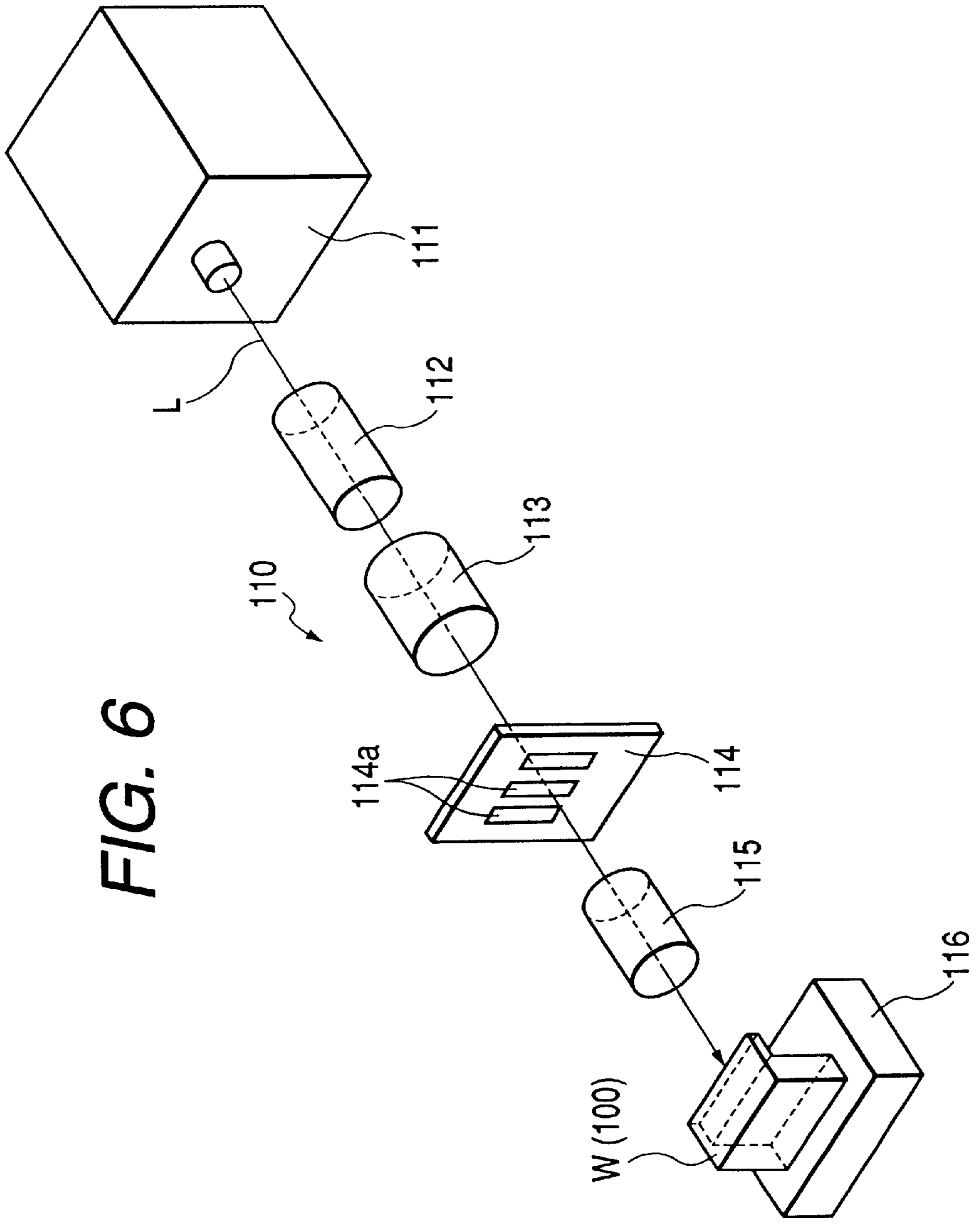
FIG. 6 is a view which shows schematically the structure of the laser processing apparatus used when the discharge ports are processed on the ceiling plate of a liquid jet recording head.
Figure 7:
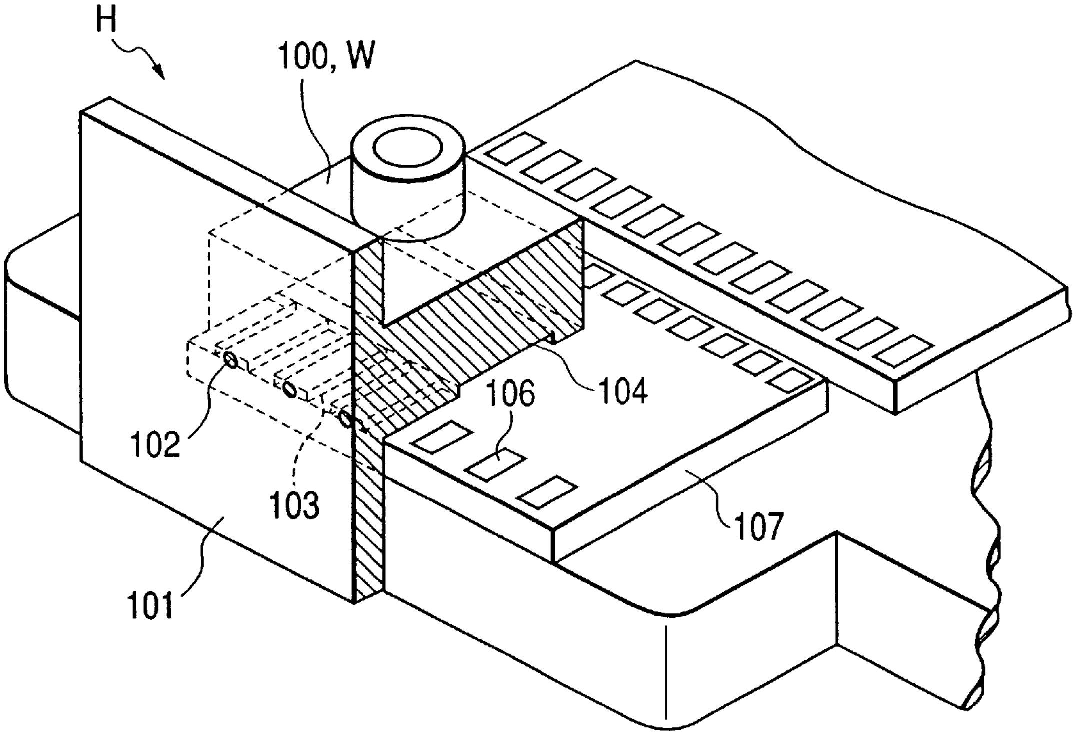
FIG. 7 is a partly broken structural view which schematically shows a liquid jet recording head.

Now, FIG. 5 shows the correction flow of the discharge port formation angle with the feed back of the measured discharge angle to the manufacturing step of the liquid jet recording head. In FIG. 5, the ceiling plate provided with the liquid chamber and others by the injection molding using an appropriate material to form the ceiling plate (S1). Then, by use of the laser processing apparatus shown in FIG. 6, the liquid flow paths are processed, at first, by the irradiation of laser on the ceiling plate (S2). After that, using the laser processing apparatus, the discharge ports are processed likewise on the discharge port plate of the ceiling plate (S3). The ceiling plate having the laser processed discharge ports on it is placed immediately in the liquid discharge condition inspecting apparatus described above. Then, in accordance with the above-mentioned algorithm, the liquid which is discharged from the discharge ports of the ceiling plate is observed to measure the liquid discharge angle (S4). In other words, the ceiling plate for which the discharge ports are processed and formed is fixed in the liquid tank of the liquid discharge condition inspecting apparatus in the state where the ceiling plate is not bonded to the discharge energy generating means. Then, liquid is supplied to the interior of the liquid tank. After that, pressure is exerted on the liquid so as to break the menisci of the discharge ports to form the condition of the continuous flow out of the liquid. Thus, the discharge direction of the liquid that flows out from the discharge ports is measured to calculate the liquid discharge angle. The liquid discharge angle based upon the result of the measurement is compared with the regular discharge angle which is set in advance (S5), and if any deviation from the regular angle is found, the feed back is executed to the discharge port manufacturing step (S3) of the laser processing apparatus in accordance with the amount of the deviation thus found, thus making the correction thereof to the regular discharge angle. Also, if the measured liquid discharge angle is the same as the regular angle, the laser processing of the liquid discharge ports is continued as it is.

As described above, immediately after the discharge ports are processed and formed on the ceiling plate that constitutes the liquid jet recording head, that is, without waiting for the completion of the liquid jet recording head, it is possible to inspect the discharge direction of liquid and the discharge angle at the component level where no discharge energy generating means is bonded to the ceiling plate. Therefore, if the discharge direction should be deviated from the regular value, it is possible to feed back the correction value to the processing step of the discharge ports immediately. In accordance with the result of inspection, the discharge port formation angle is adjusted to make it possible to process and form the discharge ports in the regular direction.

Here, in accordance with the present embodiment, the laser machining is applied to the discharge port processing. However, even when the discharge ports are processed by some other means, such as press working, it is possible to apply the method and the apparatus of the present invention for inspecting liquid discharge condition.

Also, in accordance with the embodiment described above, it is arranged to exert pressure upon liquid in the interior of the liquid tank by supplying compressed air to the liquid tank through the compressed air supply port, and to force the liquid to flow out from the discharge ports of the ceiling plate. However, in place of the compressed air supply port provided for the liquid tank, a vibrating plate may be installed on the upper part of the liquid tank, and then, it may be arranged to exert pressure in the liquid tank by means of the vibrating plate to be driven by means of piezoelectric devices. Here, the driving frequency of the piezoelectric devices is set at the same frequency as the one applied to recording images by use of the liquid jet recording head. With the intermittent driving thereof, the liquid is forced to flow out. In this respect, the algorithm of the angular measurement of the water flux is the same as the embodiment described above. Therefore, the description thereof will be omitted.

In accordance with the present invention described above, it is possible to obtain the following effect:

Without waiting for the completion of a liquid jet recording head, the liquid discharge direction of the discharge ports is inspected immediately after the discharge ports are processed and formed, that is, on the component level.

Then, if the liquid discharge angle is found to be deviated from the regular value, the correction value is fed back immediately so as to adjust the discharge formation angle to the regular value, hence making it possible to process and form the discharge ports exactly.

In this manner, the inspection result of the liquid discharge direction is reflected upon the manufacturing step promptly, thus enhancing the production yields significantly.

Also, with a simply arranged structure, it becomes possible to inspect the discharge direction and the discharge angle of the liquid discharged from the discharge ports promptly and exactly in a shorter period of time.

What is claimed is:

1. A method for inspecting a liquid discharge condition of a liquid jet recording head structured by assembling a ceiling plate having a discharge port formed thereon to discharge liquid, and energy generating means to generate energy for discharging liquid, comprising:

forcing liquid to flow out from the discharge port of said ceiling plate after the discharge port is formed on said ceiling plate, but before said ceiling plate and said energy generating means are assembled;

observing and measuring a condition of the flow of liquid out from the discharge port according to said forcing step; and calculating a discharge angle of said liquid.

2. A method for inspecting the liquid discharge condition of a liquid jet recording head according to claim 1, further comprising a processing step for processing the discharge port of said ceiling plate, wherein the liquid discharge angle is fed back to the processing step.

3. A method for inspecting the liquid discharge condition of a liquid jet recording head according to claim 1 or claim 2, wherein the ceiling plate is fixed in a liquid tank immediately after the discharge port is processed and formed on the ceiling plate, and liquid is injected into said liquid tank, and pressure is exerted on said liquid to force the liquid to flow out from the discharge port.

4. A method for inspecting the liquid discharge condition of a liquid jet recording head according either one of claim 1 or claim 2, wherein the liquid is water or a recording liquid actually used for recording an image.

5. A method for inspecting the liquid discharge condition of a liquid jet recording head according to claim 3, wherein a pressure exerted on the liquid in said forcing step breaks a meniscus of the discharge port of the ceiling plate to form a condition of continuous flow out of the liquid.

6. A method for inspecting the liquid discharge condition of a liquid jet recording head according to claim 5, wherein compressed air is used to exert pressure on the liquid.

7. A method for inspecting the liquid discharge condition of a liquid jet recording head according to claim 5, wherein a vibrating plate provided with a piezoelectric element is used to exert pressure on the liquid.

8. An apparatus for inspecting the liquid discharge condition of a liquid jet recording head that is assembled from a ceiling plate having a discharge port formed thereon and from energy generating means for discharging liquid from the discharge port, said apparatus comprising:

means for forcing liquid to flow out from a discharge port of the ceiling plate after the discharge port is formed thereon, but before said ceiling plate and said energy generating means are assembled; and an observation and measurement system to observe and measure a condition of the flow of liquid out from said discharge port, and to calculate a discharge angle of the liquid.

9. An apparatus for inspecting the liquid discharge condition of a liquid jet recording head according to claim 8, further comprising:

processing means for processing the discharge port; and controlling means for feeding back the liquid discharge angle by said observation and measurement system to the processing means.

10. An apparatus for inspecting the liquid discharge condition of a liquid jet recording head according to claim 9, wherein said means for forcing the liquid to flow out from the discharge port of the ceiling plate comprises a liquid tank containing the liquid and having pressure means for exerting a specific pressure on said liquid, and a ceiling plate fixing mechanism in said liquid tank to fix the ceiling plate therein.

11. An apparatus for inspecting the liquid discharge condition of a liquid jet recording head according to claim 10, wherein the liquid tank is installed on a movable stage, and provided with an opening on the bottom thereof to enable the discharge port of the ceiling plate to be exposed downward, and the ceiling plate fixing mechanism is arranged to position the discharge port of said ceiling plate on said opening and fix said ceiling plate.

12. An apparatus for inspecting the liquid discharge condition of a liquid jet recording head according to claim 10 or claim 11, wherein the pressure means of the liquid tank is structured to exert pressure on liquid in the liquid tank by supplying compressed air into the liquid tank.

13. An apparatus for inspecting the liquid discharge condition of a liquid jet recording head according to claim 10 or claim 11, wherein the pressure means of the liquid tank is provided with a vibrating plate having a piezoelectric element on the upper part of the liquid tank, and structured to exert pressure intermittently by driving said piezoelectric element.

* * * * *